US008027560B2

(12) United States Patent
Brady, Jr. et al.

(10) Patent No.: US 8,027,560 B2
(45) Date of Patent: Sep. 27, 2011

(54) SYSTEM AND METHOD FOR SYNCHRONIZING PLAYBACK OF AUDIO AND VIDEO

(75) Inventors: Kenneth A. Brady, Jr., Trabuco Canyon, CA (US); Lyle K. Norton, Irvine, CA (US); George Treneer, Oceanside, CA (US)

(73) Assignee: Thales Avionics, Inc., Irvine, CA (US)

( * ) Notice: Subject to any disclaimer, the term of this patent is extended or adjusted under 35 U.S.C. 154(b) by 1137 days.

(21) Appl. No.: 11/702,251

(22) Filed: Feb. 5, 2007

(65) Prior Publication Data

US 2008/0187282 A1    Aug. 7, 2008

(51) Int. Cl.
*H04N 5/932* (2006.01)
*H04N 5/77* (2006.01)
*H04N 5/931* (2006.01)

(52) U.S. Cl. ........ 386/203; 386/201; 386/229; 386/207; 386/208; 386/354; 375/293; 375/256; 375/240.28; 348/513; 348/521

(58) Field of Classification Search .................. 386/200, 386/203, 229, 201, 354; 375/293, 256, 240.28; 348/513, 521
See application file for complete search history.

(56) References Cited

U.S. PATENT DOCUMENTS

| | | | |
|---|---|---|---|
| 4,887,279 A | 12/1989 | Odenheimer | |
| 5,396,497 A | 3/1995 | Veltman | |
| 5,430,485 A * | 7/1995 | Lankford et al. | 348/423.1 |
| 5,559,999 A | 9/1996 | Maturi et al. | |
| 5,652,627 A | 7/1997 | Allen | |
| 5,831,666 A * | 11/1998 | Palmer et al. | 348/14.12 |
| 5,844,600 A * | 12/1998 | Kerr | 348/14.12 |
| 5,889,791 A * | 3/1999 | Yang | 714/752 |
| 6,088,063 A | 7/2000 | Shiba | |
| 6,122,668 A | 9/2000 | Teng et al. | |
| 6,931,071 B2 | 8/2005 | Haddad et al. | |
| 6,975,363 B1 | 12/2005 | Baldwin et al. | |
| 2001/0033619 A1* | 10/2001 | Hanamura et al. | 375/240.26 |
| 2002/0106018 A1 | 8/2002 | D'Luna et al. | |
| 2004/0062314 A1 | 4/2004 | Demas et al. | |
| 2006/0146850 A1 | 7/2006 | Virdi et al. | |
| 2007/0019739 A1* | 1/2007 | Koyanagi et al. | 375/240.25 |
| 2008/0059724 A1* | 3/2008 | Stifter, Jr. | 711/154 |

* cited by examiner

*Primary Examiner* — Helen Shibru
(74) *Attorney, Agent, or Firm* — Myers Bigel Sibley Sajovec

(57) ABSTRACT

A system and method for providing a digital In-Flight Entertainment (IFE) system in a vehicle, such as an aircraft, that is capable of presenting a video program and associated audio in a synchronized manner to a large number of individual video monitors and speakers. The system and method employ processing operations in at least one decoder of the IFE system, to perform operations such as adjusting a local clock based on a master clock, setting a delay time in relation to a master clock, and adjusting video and audio playback based on the delay, to substantially synchronize playback of the audio and video data by the audio and video players, to thus eliminate or at least minimize the negative effects of source and load based jitter, network delays, clock drifts, network errors and decoder buffering differences, on synchronizing video and audio playback.

18 Claims, 15 Drawing Sheets

SYSTEM AND METHOD FOR SYNCHRONIZING PLAYBACK OF AUDIO AND VIDEO

BACKGROUND OF THE INVENTION

1. Field of the Invention

The present invention relates to a system and method for providing a digital In-Flight Entertainment (IFE) system in a vehicle, such as an aircraft, that is capable of presenting a video program and associated audio in a synchronized manner to a large number of individual video monitors and speakers. More particularly, the present invention relates to a system and method for achieving synchronized playback of a video program and associated audio across a large population of video and audio playback devices in an IFE system.

2. Description of the Related Art

IFE systems generally have used analog distribution technology to distribute broadcast video material, and either analog or Pulse-Code Modulation (PCM) digital for audio material. Typically, video programs originate from a single source and are distributed, through RF modulation or baseband distribution technologies, throughout the aircraft. When the video programs are distributed as analog signals, the delay from the source to the presentation device, such as a video player or overhead monitor, is very small and usually within microseconds. It addition, analog video is presented essentially as it is received by the display device. Therefore, if a baseband or RF modulated signal is distributed to all video players and overhead monitors, these presentation devices are typically synchronized to within microseconds.

In IFE systems using PCM digital distribution, the audio material is sampled at a rate consistent with the digital distribution system. Each sample of the audio is transmitted over a dedicated digital distribution system. Many systems use a Time Division Multiplex (TDM) scheme for combining multiple audio programs into a multiplexed digital data stream. The audio player identifies the time slot(s) that are to be used, extracts the samples from the desired time slot(s) and convert the sample back into an analog signal. By transmitting the audio signal sample-by-sample and by using a dedicating distribution network for this purpose, the audio is presented approximately one sample-time delayed from its source.

Current systems typically use either baseband or RF modulated video distribution for programs that are simultaneously presented to a large number of viewers. Since there is little processing performed at the presenting device and the information is distributed essentially in real time, these distribution and presentation techniques are capable of presenting video and audio that are synchronized within microseconds.

With digital content, the video and audio can be transmitted essentially un-encoded However, one video program alone would require more than 80 Mbps and one stereo audio program would require around 1.2 Mbps. This extremely high data rate requirement makes such a distribution technique impractical.

The baseband or RF modulated process currently used in aircraft can be somewhat effective in maintaining synchronization, but severely limits the quality of the video image being presented. As understood by one skilled in the art, baseband or RF modulated systems utilize the analog video standards such as PAL, SECAM, or NTSC, and these standards significantly limit the video resolution. In addition, these standards require analog signal distribution which is inconsistent with the desire to provide an all-digital entertainment network. In an aircraft IFE system, the inclusion of separate analog wiring, amplifiers and other components to support analog video/audio distribution separate from digital audio/video distribution for individual services is highly undesirable.

The added wiring can be bundled with the digital wiring to minimize the number of connectors required, and splitters and amplifiers can be combined into other boxes to minimize the cost and weight of supporting the extra functions. However, even the impact on cost, weight, power, and space can be minimized in this manner, the inclusion of both digital and analog video/audio distribution does increase the cost, weigh, and power of the system. In addition, there is a clear visual difference between video service provided by the analog distribution system when compared to that provided by the digital distribution system.

An example of a technique for synchronizing audio and video signals is set forth in U.S. Pat. No. 6,122,668.

BRIEF DESCRIPTION OF THE DRAWINGS

Certain objects, advantages and novel features of the invention will be more readily appreciated from the following detailed description when read in conjunction with the accompanying drawings, in which.

DETAILED DESCRIPTION OF THE PREFERRED EMBODIMENTS

As discussed in more detail below, the embodiments of the present invention provide a system and method for presenting video and associated audio to multiple presentation devices, such as multiple video players and multiple audio headsets in an IFE system in a vehicle. This environment is typically an airplane, train, bus, boat, ship, or other multi-passenger vehicle where there are multiple overhead video monitors being viewed by multiple passengers who listen to the audio associated to the overhead video program through a headset plugged into an audio jack local to the passenger's seat. In such an environment, the presentation of the video image on the overhead video monitors and the audio to the passenger headsets should be sufficiently synchronized to provide an acceptable viewing experience. Hence, the system and method according to the embodiments of the present invention described herein synchronize the video and audio decoding and presentation to multiple displays and headsets in an IFE system.

Figure 1A:
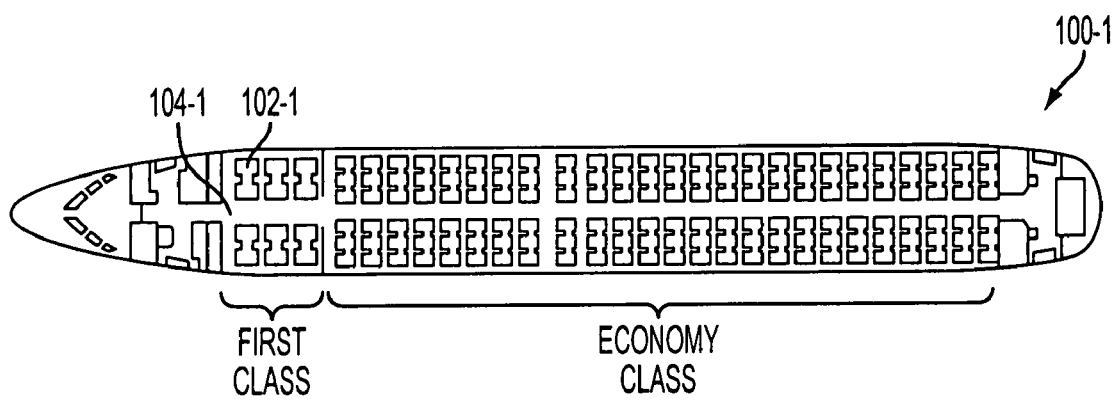
FIGS. 1A and 1B are diagrams illustrating examples of seating layouts for commercial aircraft in which an embodiment of the present invention is employed.
Figure 1B:
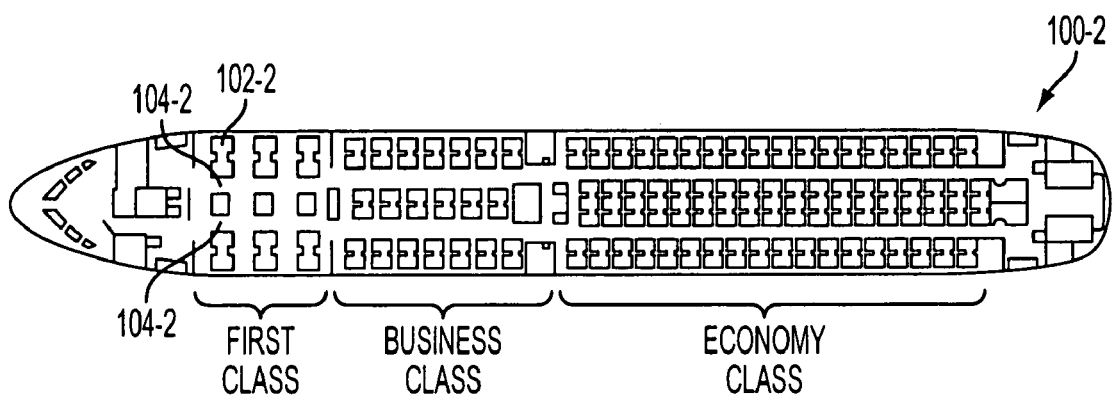
Figure 2:
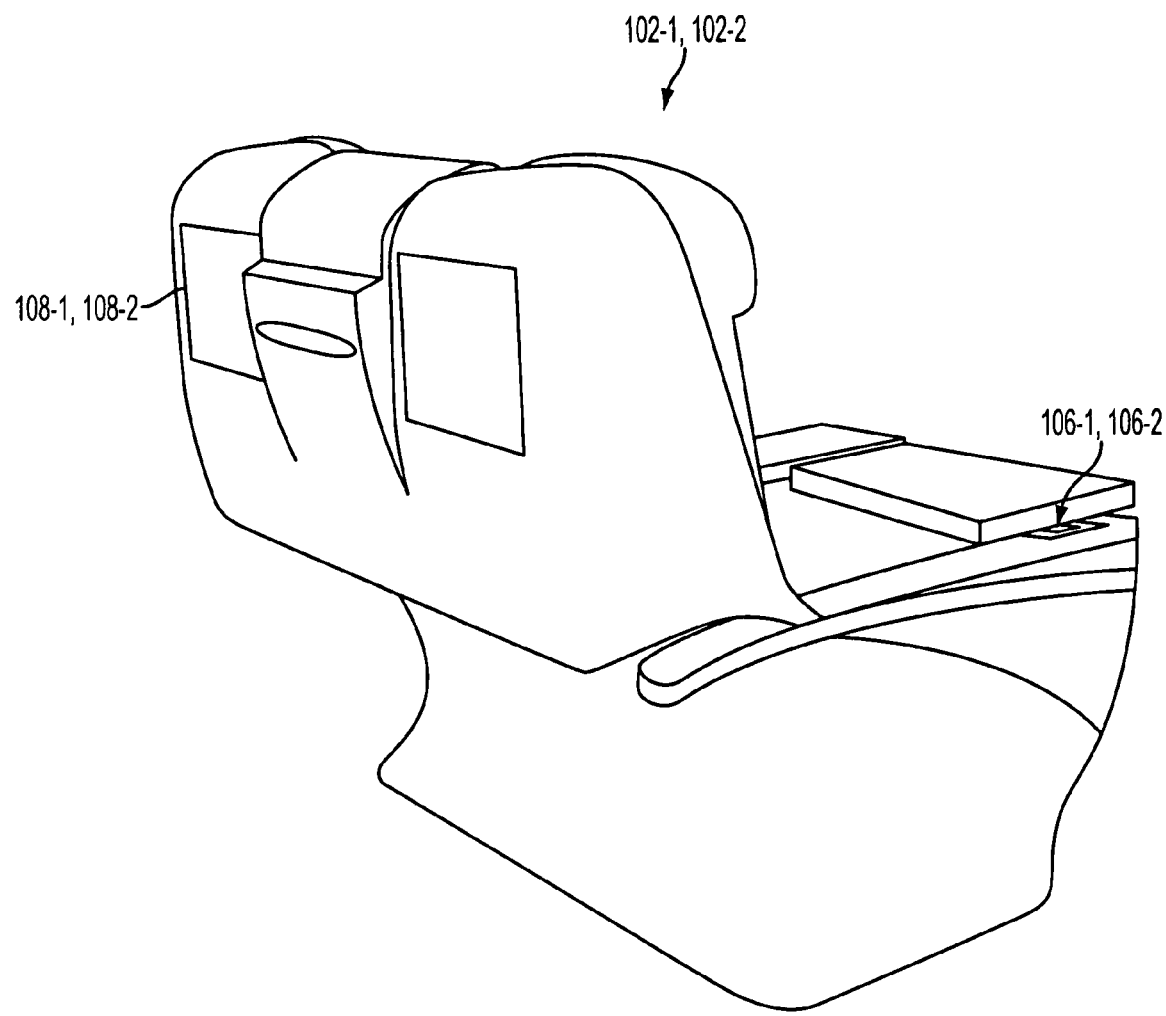
FIG. 2 illustrates an example of an in-seat video player arrangement for the commercial aircraft as shown in FIGS. 1A and 1B.

FIGS. 1A and 1B illustrate examples of typical seating arrangements for aircrafts 100-1 and 100-2. As shown, the environment of an IFE system for an aircraft 100-1 or 100-2 includes a densely packed population of passenger seats 102-1 or 102-2 (referred to as a seat or seats 102) organized into rows and columns. Seats are typically organized into groups of from 2 to 4 seats, and seat groups are placed into long rows running from the front to the back of the aircraft. Short distance aircraft 100-1 typically have two rows of seat groups with the center aisle 104-1 for access. Longer distance aircraft 100-2 typically have three rows of seat groups with two aisles 104-2 for access. As shown in FIG. 2, each passenger seat 102 is provided with a headset jack 106-1 or 106-2 (referred to as headset jack or jacks 106) into which an audio headset can be plugged.

Entertainment audio is typically presented to each passenger over their respective headset. Entertainment video is typically presented to passengers in two different ways, either via overhead video monitor 124 (see FIG. 3) or via an in-seat video player 108-1 or 108-2 (see FIG. 2). In the overhead video arrangement, an aircraft 100-1 or 100-2 is fitted with a number of overhead video monitors 124 onto which a video program can be presented. Overhead video systems have evolved from those which provided a single video projector in each major zone of the aircraft cabin to current systems which provide a large number of individual monitors hung from the ceiling or baggage bins. In current systems, each passenger can choose to watch the overhead monitor most convenient for his personal viewing.

Figure 3:
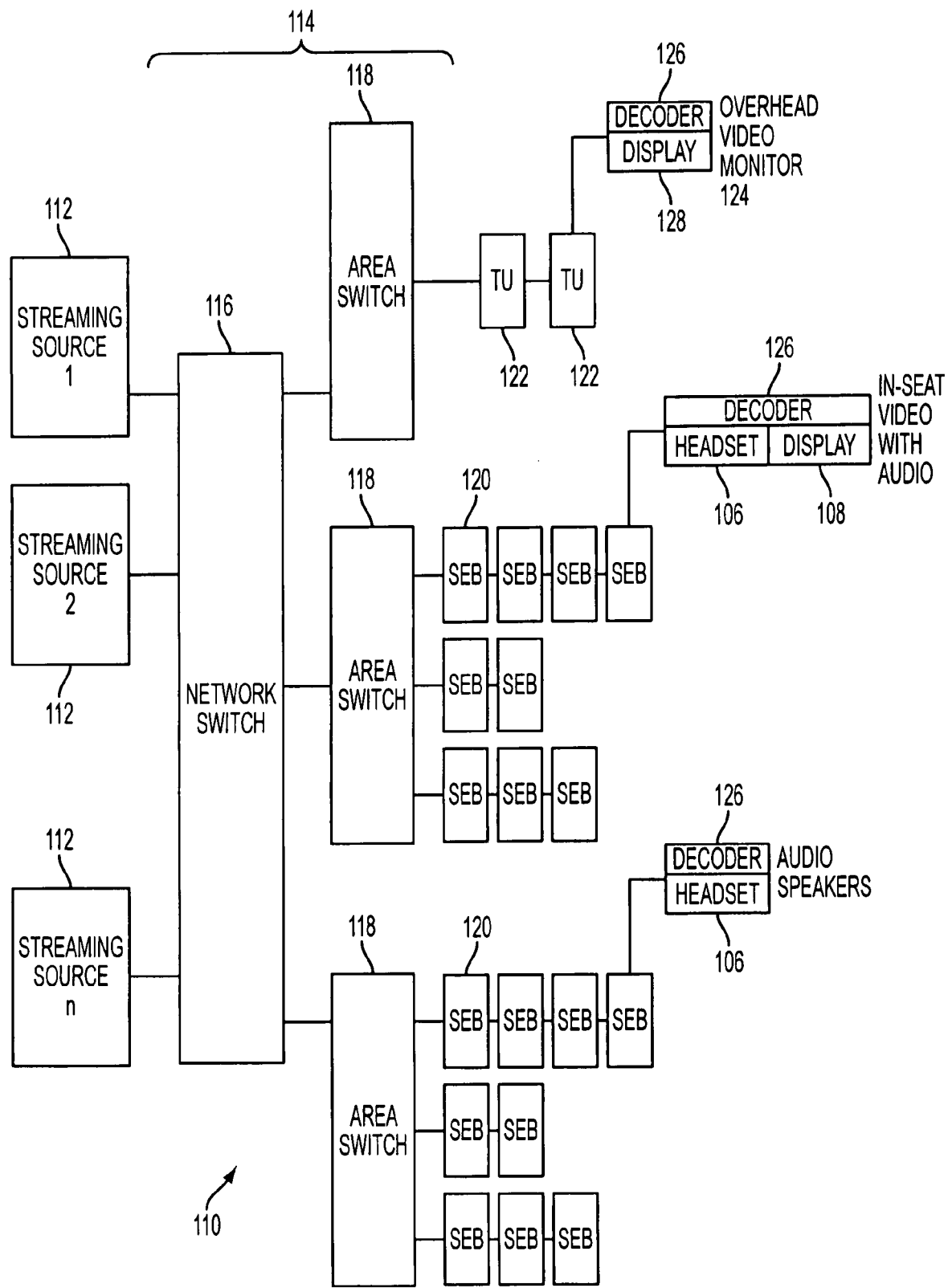
FIG. 3 is a conceptual block diagram illustrating an example of an IFE system employed in an aircraft as shown in FIGS. 1A and 1B and which employs an embodiment of the present invention.

In the in-seat video player arrangement, the aircraft 100-1 or 100-2 is equipped with individual video players 108-1 or 108-2 (referred to as a video player or players 108) for each passenger seat 102, as shown in FIG. 2, which provides each passenger with an individualized entertainment experience. It is common to combine both types of video presentation into an aircraft, and it is also common to differentiate service to different passenger classes (e.g., in-seat video for first and business classes, and overhead video in economy class). In either case, the overhead video monitors and in-seat video players 108 communicate with an IFE system 110 as shown in FIG. 3 and discussed below.

As can be appreciated by one skilled in the art, digital video and audio using compression techniques like MPEG have been introduced into IFE systems 110. As further understood in the art, video compression is the process of reducing the amount of digital data required to reproduce a video (and associated audio) program. Raw sampled video (e.g., the equivalent of PCM audio in the video domain) would require between 80 and 120 Mbps for a single video program. Video compression, such as MPEG, exploits the highly redundant nature of video to reduce such a program to data rates as low as 1.5 Mbps or lower. An MPEG encoder collects samples at the high rate and, through the use of a variety of algorithms, produces a low rate data stream from which the original video program can be recreated by a decoder, with the recreation being similar to but not necessarily identical to the same as the original image.

In the process of performing this extremely effective data reduction, the resulting data stream does not have the "frame by frame" characteristics of the original program. One of the primary actions performed by the decoder is to take an occasional image and change information (e.g., the I, P, and B frames in MPEG terminology) and reconstruct the complete program video frames. As can be appreciated, the decoder takes time to perform the decoding process and the original frame timing is "reconstructed" by the process. The combination of temporary buffering, storing, and executing the decoding algorithim thus tends to make players vary slightly in the actual presentation of the images.

As discussed in more detail below, an all digital IFE system 110 generally should present a specific video program on a large population of overhead monitors 124 and maintain synchronization between the video images presented on those monitors to within two (2) video frames or 66 ms (assuming 30 frames per second), so that a passenger who can see multiple overhead monitors 124 does not see different images of the video program being displayed on the multiple monitors.

In addition, an all digital IFE system 110 should present the audio associated with the video program to the passenger headset generally in sync with the video program. Experience indicates that a variation of more than two (2) video frames (66 ms) between the video and audio will be recognized by the passenger as a synchronization flaw (commonly referred to as loss of "lip sync" or synchronization between the speakers lips and the audio). The requirement for such synchronization is not limited to persons speaking, but is equally applicable to other aspects of a video soundtrack such as a person walking, hands clapping, water dripping, or many other aspects of an audio/video presentation. An all digital IFE system 110 should also be able to present a specific video program on all monitors in the aircraft (overhead and in-seat) and maintain the video and audio/video synchronization discussed above, such that the playback of the video and audio is substantially synchronized to within 66 ms or about 66 ms as discussed above.

An example of the physical architecture of the digital network in a typical IFE system 110 is further illustrated in FIG. 3. The basic components are a set of head end sources 112, which can be referred to as streaming sources, a distribution network 114 that can include one or more network switches 116 and a plurality of area switches 118, and columns of seat components such as seat electronic boxes (SEBs) 120 and tapping units 122. The streaming sources 112 can be digital servers (with preloaded MPEG digital content) or real-time encoders capable of converting input video and audio into MPEG data. The network switch 116 can be, for example, a layer 2 or layer 3 Ethernet switch, and is configured to connect any streaming source 112 to any component of the IFE system 110 of the aircraft. An area switch 118 is provided in each area of the aircraft 100-1 or 100-2 to connect the network switch 116 to multiple columns of seats. In this example, each area switch 118 connects to three seat columns, but the number of seat columns to which an area switch 118 connects can vary as desired.

Each seat group as discussed above is fitted with an SEB 120, and the components at the seats 102, such as the video players 108 and headset jacks 106, are wired from an area switch 118 through a number of SEBs 120 arranged in a seat column. As can be appreciated by one skilled in the art, an SEB 120 extracts data packets intended for locally attached players (decoders) and passes other packets through to the next SEB 120 in the seat column as required.

As further shown in FIG. 3, each overhead monitor 124 typically includes or is associated with a decoder 126 and a display 128. The overhead monitors 124 are, in this exemplary arrangement, connected to the IFE system 110 through a set of tapping units (TU) 122 that perform the same or similar functions as the SEBs 120. As also shown, each headset jack 106, and in-seat video player 108, includes or is associated with a decoder 126 that is connected to an SEB 120 as discussed above.

Many IFE systems 110 have multiple video programs stored on a server 112. When playback is desired, a video player (e.g., video player 108 or overhead monitor 124) obtains the material from the streaming source (e.g., server) 112 and decodes the compressed content into a presentable form. If the material is to be presented on overhead monitors 124 or in a video announcement that is to be simultaneously viewed by all passengers, the material typically can be decoded by a single player and distributed to all monitors using the analog techniques described in the Background section above. If the material is to be presented to a passenger on an individual basis (e.g., Video on Demand) then the passenger has a dedicated player (e.g., a video monitor 108) and that player can obtain the compressed digital program and decoded it specifically for the passenger.

To support a broadcast program, a streaming source 112 would typically transmit a digital stream throughout the digital network of the IFE system 110 using a network protocol appropriate for a one-to-many relationship. As can be appreciated by one skilled in the art, typically TCP/IP communications can be used for one-to-one communications. Also, a one-to-many network protocol, commonly referred to as a "multi-cast," can be combined with a fixed rate streaming protocol such as a Real-Time Protocol (RTP).

As can further be appreciated by one skilled in the art, multicast on an IP network typically assigns each multicast program a specific multicast IP address. The source 112 then transmits the program onto the network (e.g., using RTP) with a broadcast layer 2 address and the assigned multicast layer 3 address. The network of the IFE system 110 can make this stream available to all network devices, such as video player 108 and overhead monitors 124. A player (e.g., video player 108) can present this program by "subscribing" to the program using the IGMP protocol specifying the desired multicast IP address. This process permits the streaming source to transmit a single data stream and have it received by all desired players on the network.

The example of the data network architecture described above with regard to FIG. 3 enables a streaming source 112 to produce a single packetized video/audio stream which is available to all desired video players 108 and overhead monitors 124 in the aircraft 100-1 or 100-2. This arrangement allows for a personal, in-seat presentation of a common source program to requesting passengers.

Figure 4:
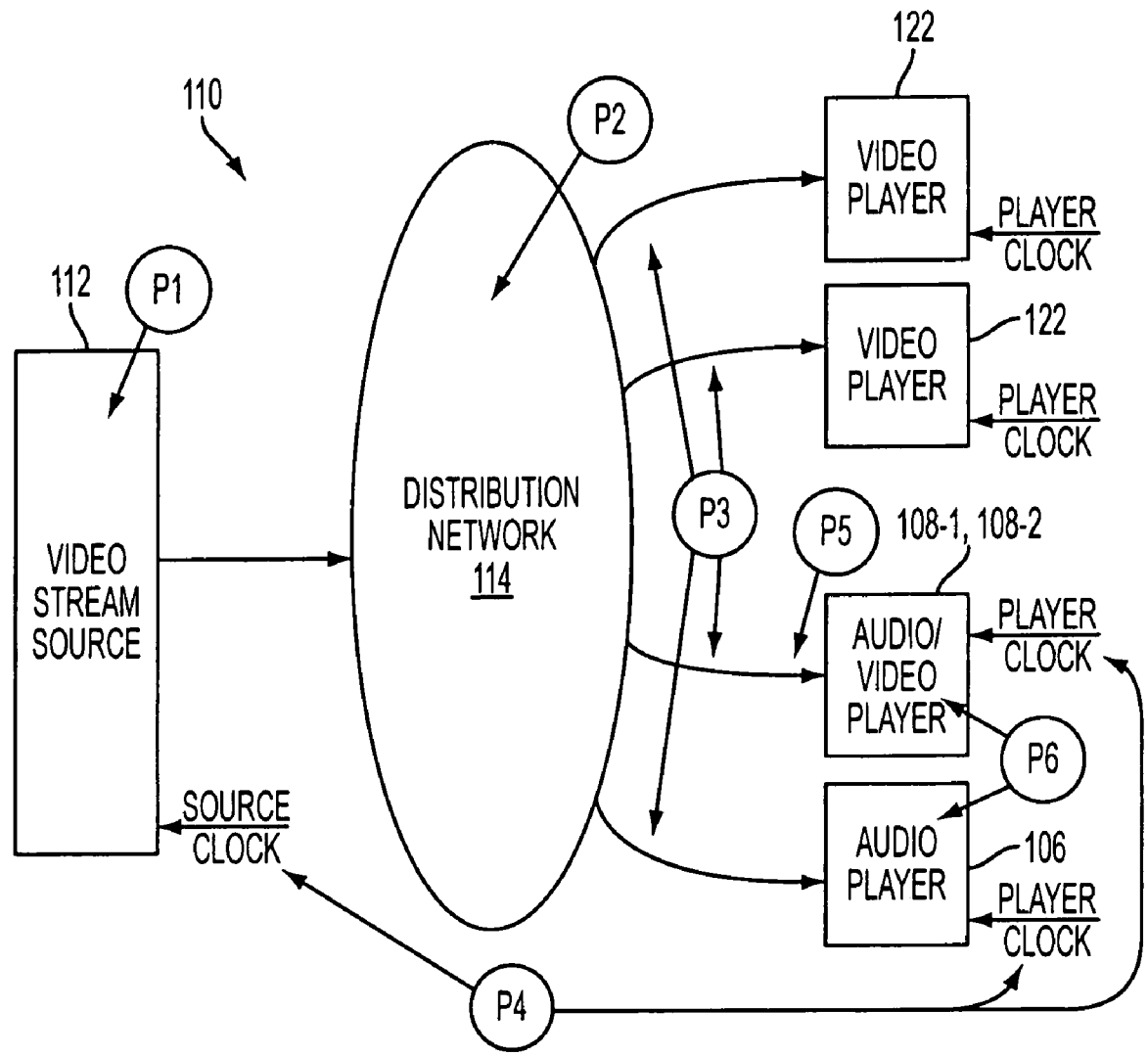
FIG. 4 is a conceptual block diagram illustrating operations associated with the components of the IFE system shown in FIG. 3.

FIG. 4 is a functional overview of the IFE system 110 illustrated in FIG. 3, and identifies 6 specific sources of synchronization problems in a digital system, which can be referred to as Problems P1 through P6. As can be appreciated from the following, the system and method employed in the IFE system 100 addresses these 6 problems to achieve synchronized or substantially synchronized playback of video and audio with multiple players.

Problem P1—Source Based Jitter

Figure 5:
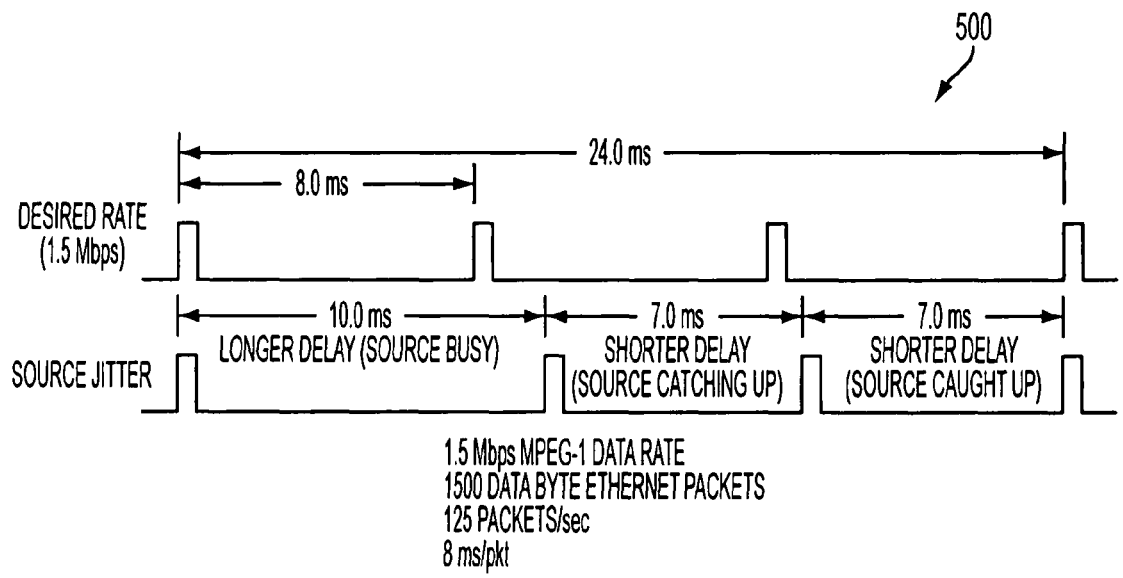
FIG. 5 is a timing diagram illustrating an example of the effect of source jitter in the system as shown in FIG. 3.

Since the IFE system 110 in this example employs an Ethernet, which is a packetized data network, the source 112 transmits the data in packets. Naturally, the IFE system 110 can include any other suitable type of wired or wireless network, or a combination of both. While the overall average data rate will typically match the play rate of the material, the individual packets are transferred at much higher speed with dead-time between packets. If a source 112 is only producing one stream, the packets will likely be transmitted at a very regular rate. However, as shown in the timing diagram 500 of FIG. 5, if the source 112 is performing multiple functions, the overall data rate may be correct but the dead-time between packets may vary from packet to packet. Furthermore, if the source 112 is actually producing multiple streams at different data rates, significant variability can exist in the packet-to-packet transfer rate.

Problem P2—Load Based Jitter

Figure 6:
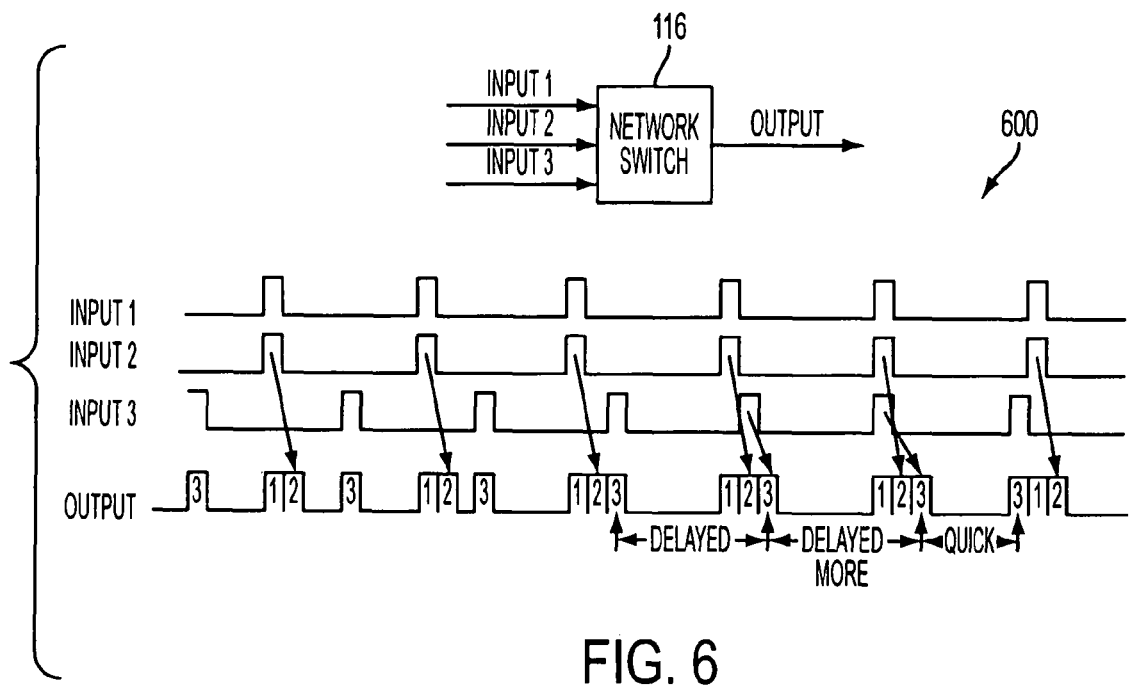
FIG. 6 is a block diagram illustrating an example of a network switch employed in the system as shown in FIG. 3, and a timing diagram illustrating an example of the effect of load based jitter in the system as shown in FIG. 3.

Even if all sources 112 produced their packets at exactly the correct time for the desired data rate, the fact that only one packet may exist on any network interface at any time can cause temporary time delays and therefore jitter on the network. FIG. 6 illustrates an example of the manner in which 3 inputs (Input 1, Input 2 and Input 3) into network switch 116 (see FIG. 3) with perfect timing can produce an output from network switch 116 with considerable re-ordering and timing variation, referred to as jitter. As indicated in the timing diagram 600, the output of certain packets will be delayed until a point when packets will be output out of order. In this example, packets from Input 3 will eventually be output out of order from switch 116, and thus before packets from Inputs 1 and 2.

Problem P3—Unequal Network Delay

As can be appreciated by one skilled in the art, in a switched Ethernet system, such as that employed in IFE system 110, each Ethernet switch receives an entire 1500+ byte maximum transmission unit (MTU) and verifies the integrity of the MTU before forwarding the MTU to the appropriate output ports. Hence, there is a delay from network link to network link equal to or about equal to the time necessary to transmit an MTU plus whatever overhead time is used by the switch to make routing decisions. For a 100BaseT network, each MTU takes approximately 125 microseconds (μs) of transfer time. If a single, multicast packet is transmitted form a source 112 in the network illustrated in FIGS. 3 and 4, the time from message start to message receipt will vary from 3×125 μs when a packet travels through a network switch 116, then through an area switch 118 and through an SEB 120, to 12×125 μs when a packet travels through a network switch 116, then through an area switch 118, and through ten SEBs 120. Accordingly, at a minimum (not counting internal switch decision time), there will be about at least 1 ms of difference between some seats 102 receiving the packet and other seats 102 receiving the packet. In larger networks, this network topology dependent delay can become much worse.

Problem P4—Clock Drift

Figure 7:
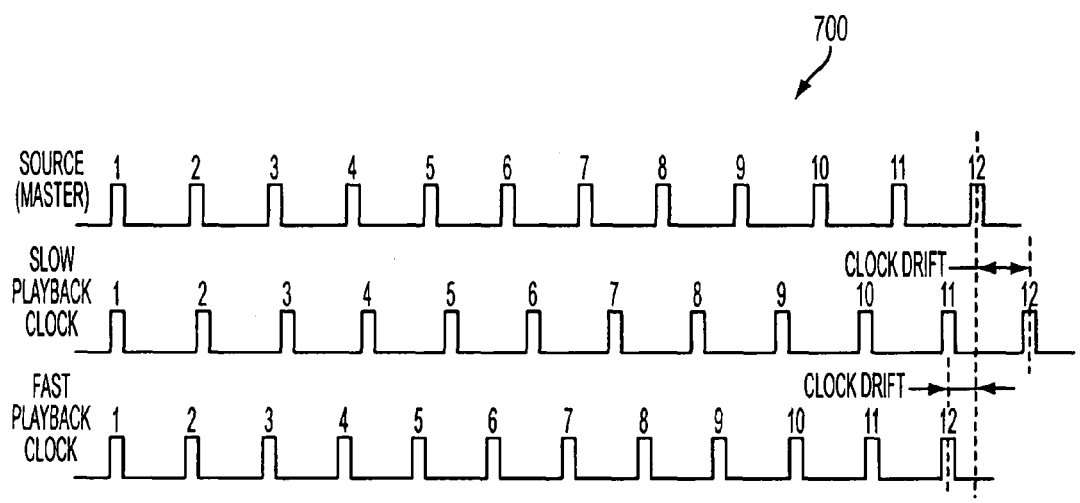
FIG. 7 is a timing diagram illustrating an example of the effect of clock drift in the system as shown in FIG. 3.

As can be appreciated by one skilled in the art, a source 112 will transmit data at a rate based on its local clock oscillator. A player, such as a video player 108, will play the data it receives based on its local clock oscillator. The match between these two local oscillators is not perfect. In addition, the local clock oscillators of two different players receiving the same data stream will also be different. Differences in good quality crystal oscillators are typically rated around 50 parts per million (including initial frequency deviations, aging and thermal effects). Therefore, two players that start exactly together will gradually drift apart as illustrated in the timing diagram 700 in FIG. 7.

To evaluate the effect of this drift, if the clock in two players differs by 50 ppm and they were playing material at 1.5 Mbps (typical MPEG-1 material), their actual data consumption rate would differ by 75 bits per second. Since one player is consuming 75 bits more per second than the other, its position in the program would advance with respect to the other by this amount. For this drift to accumulate to the equivalent of one video frame or 33 ms would take about 660 seconds or about 11 minutes. For short video programs, this phenomenon is thus irrelevant. However, over the period of a 2 hour movie, the drift will accumulate to 11 video frames or 360 ms, which is a very noticeable difference.

Problem P5—Network Errors

Network error can be one of the most significant sources of synchronization error. A single Ethernet data link is typically rated to have an error rate between 1 in $10^8$ and 1 in $10^9$. Additional sources of error include switch buffer overflow and network interface malfunction, such as excess interrupt latency, buffer overflow, and so on. Also, the volume of the data required to play a VOD movie is typically so large that error tolerance becomes relevant.

For example, a 2 hour movie can be encoded at 3.5 Mbps MPEG-2, and would thus be approximately $2.5 \times 10^{10}$ bits (e.g., 3.15 Gbytes) in size. If this movie is played with a directly connected player, about 25.2 errors would typically be expected during the 2 hour movie (assuming a $1 \times 10^9$ bits/error rate). However, in an IFE system 110, a player (e.g., video player 108) is not directly attached to the server source 112. Accordingly, en route from the source 112 to a video player 108, data will typically travel an average 6 independent Ethernet communications links (e.g., DSU-ESU, ESU-ADB, ADB-SEB1, SEB1-SEB2, SEB2-SEB3, SEB3-player), with each having the assumed error rate of $1 \times 10^9$ bits/error. Therefore, each video player 108 should expect to experience approximately 151 errors over a 2 hour movie.

Also, an individual player (e.g., video player 108) should be fairly tolerant of network errors, especially for broadcast/multicast situations where the same program is distributed to all players and synchronization is required (e.g., in an overhead video application). For a 300 seat aircraft with 25 overhead monitors 124, the system 110 overall will experience about 49,140 errors. In addition, the effect of the system errors is highly dependent on where the errors occur. For example, if an error occurs on the link from the SEB 120 to a video player 108, only one seat 102 is affected. However, if the error occurs on the link between two SEBs 120, all video players 108 that are topologically beyond the link affected will experience the error.

Figure 8:
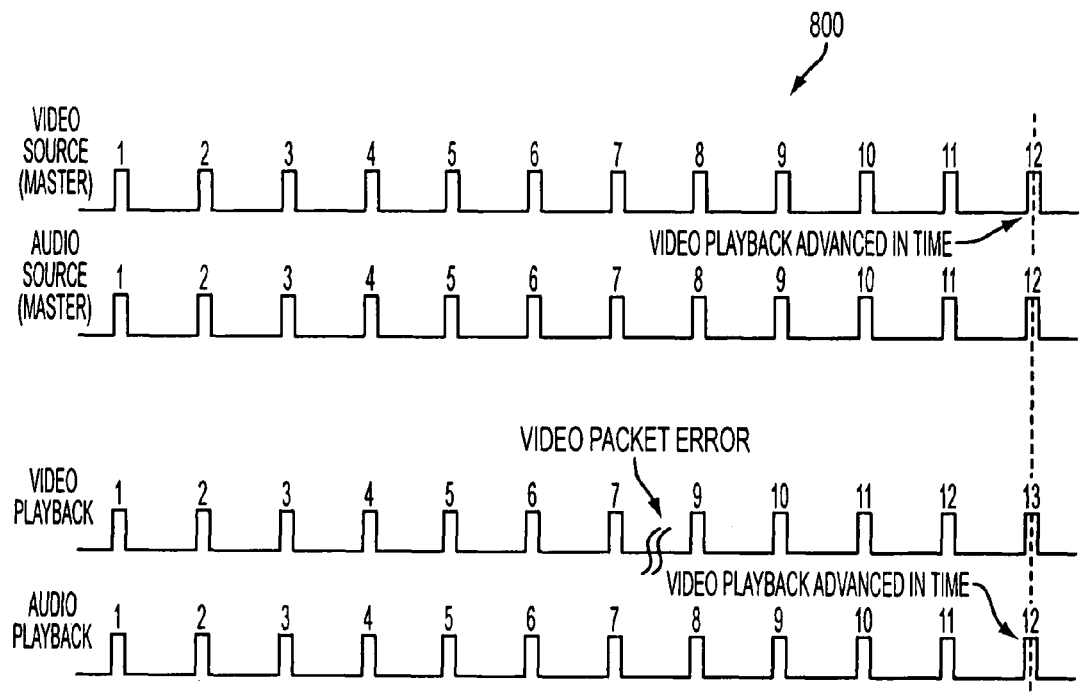
FIG. 8 is a timing diagram illustrating an example of the effect of network error in the system as shown in FIG. 3.
Figure 8:
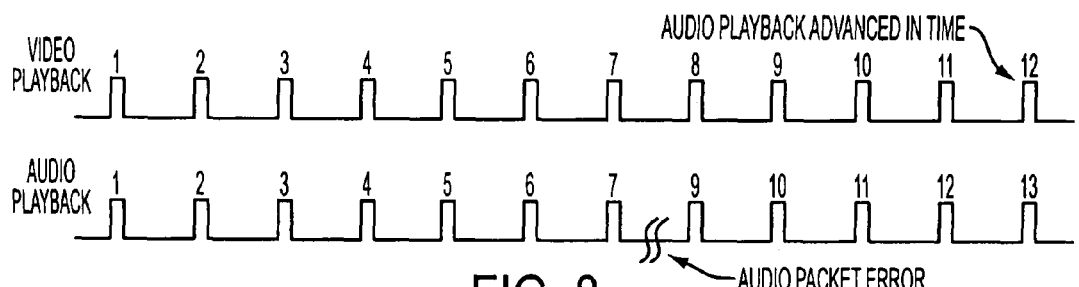

As can further be appreciated by one skilled in the art, when the system 110 is using a streaming protocol like RTP, the stream is broken up into RTP blocks whose size is typically less than 64 Kbyte, and the blocks are broken up by the UDP protocol into MTUs, whose payload size is typically 1,500 bytes or less. When an error occurs, the entire block is discarded. Since an error will occur at an arbitrary point in time, the error may affect a loss of video data, audio data or both. MPEG players are somewhat tolerant of recognizing that a disruption in the data has occurred and scanning to a point to where proper decoding can continue. However, this typically causes the playback of the audio and video to get out of sync as illustrated in the timing diagram 800 of FIG. 8.

Figure 9:
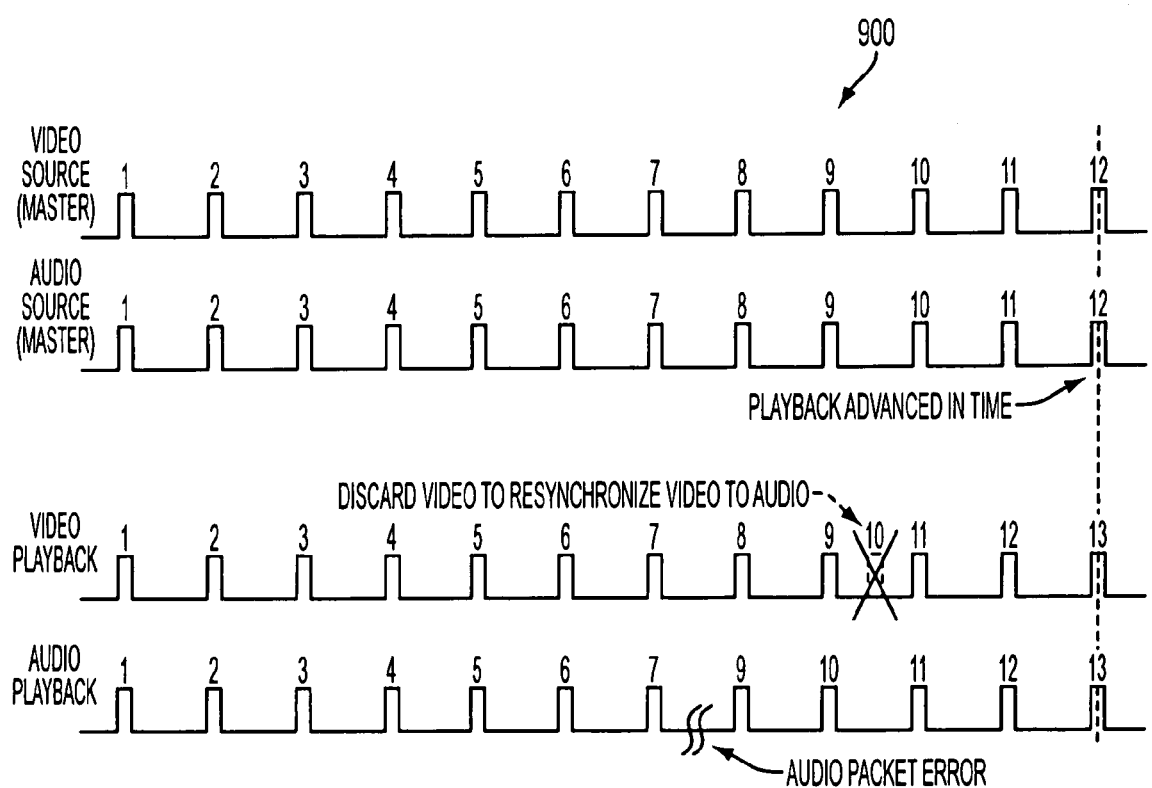
FIG. 9 is a timing diagram illustrating an example decoder resynchronization as performed in the system as shown in FIG. 3.

Further ore, MPEG encoding provides for time tags to be placed in the video and audio portions of the stream. This time information is intended to permit the decoder 126 as shown in FIG. 3 to determine if the audio and video are remaining in sync. If the audio and video are determined to be out of sync, a decoder 126 can perform a set of operations which provide for getting them back into sync. As can be understood by one skilled in the art, a decoder 126 buffers data prior to starting the decoding process. Hence, the most common approach when audio and video are out of sync is for the decoder 126 to discard data until the audio and video are back in sync, as illustrated in the timing diagram 900 of FIG. 9. By doing this, the overall program playback is advanced in time with respect to the original source 112 and with respect to other players attempting to present the same program in sync with each other.

Problem P6—Buffering Differences Between Decoders

Those skilled in the art recognize that errors, jitter, and clock drift are basic characteristics of any digital distribution and decoding system. Accordingly, it is common for a decoder 126 to be provided with sufficient buffer memory, functioning as a FIFO as discussed in more detail below, to insulate the playback process from the data arrival. Most digital decoders typically store up between ½ and 1 second of data before playback starts, which is a major reason that digital set-top-boxes take as long as 1 to 2 seconds to change channels. By storing this much data into a FIFO before starting the playback, the decoder 126 can make packet loss, delay in data arrival, and clock drift virtually transparent to the user.

By its very nature, using a FIFO in this way is intended to allow the player (e.g., video player 108) to be as much as ½ to 1 second (e.g., the pre-store) out of sync with the data arriving, which is typically not a problem for individual players in relatively isolated environments. However, as discussed above, problems can result if two separate playbacks are intended to remain in sync. Because of this buffering, a typical decoder 126 is configured to be out of sync with each other. Also, each decoder makes its own "start playing" decisions and thus, it is unlikely that two different decoders (e.g., a combined audio/video encoder and an audio encoder) will begin playing at exactly the same time.

Figure 10:
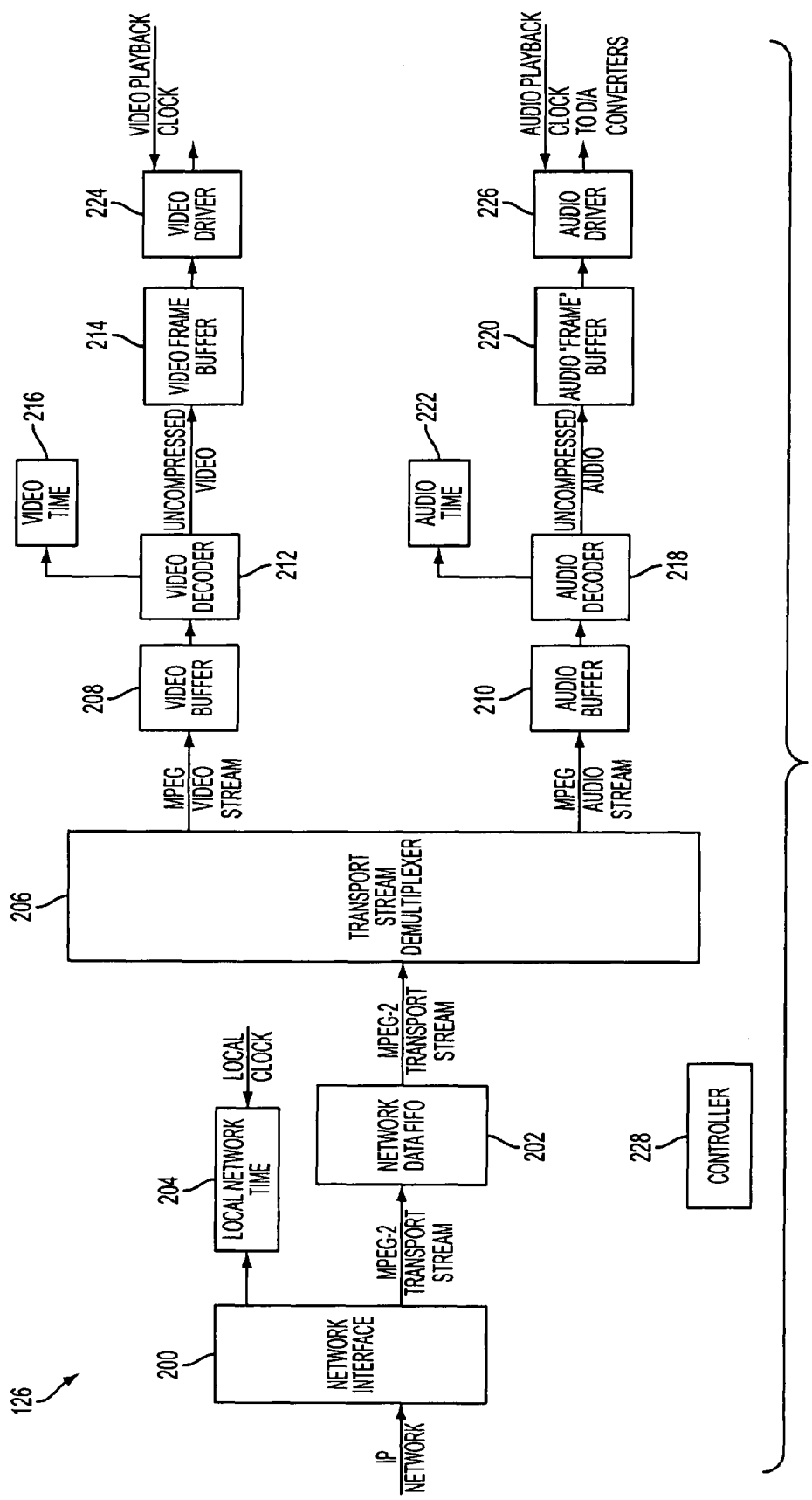
FIG. 10 is a conceptual block diagram illustrating an example of a decoder employed in the system as shown in FIG. 3.

As can be appreciated from the above, an embodiment of the present invention for maintaining synchronization between a large number of independent video players (for the overhead part of overhead video), video/audio players (for in-seat video), and audio players (for the in-seat part of overhead video) can employ features within decoders 126, that thus permit the decoders 126 to remain sufficiently in sync with each other. An example of the architecture of an IP network based MPEG decoder for decoding MPEG 2 Transport streams is illustrated in FIG. 10. Many of these functions are often integrated into silicon or software algorithms.

The encoder 126 includes a network interface 200 to pass through the RTP packets with the IP address associated with the multicast video stream of interest (IP network stream) to be decoded. The RTP packets are verified and placed into an intermediate memory 202 that functions as a first-in first-out (FIFO) memory. Incomplete packets and specific out of order packets are a result of network errors and are discarded. As indicated, the network interface 200 can provide a local network time stamp 204. The RTP packet time and/or the MPEG-2 transport stream System Time Stamp can be used to establish a relative time with respect to the incoming data stream.

The transport stream demultiplexer 206 separates the multiplexed MPEG-2 transport stream into its respective audio, video, and auxiliary data streams, and each type of stream is identified by a Program Identifier (PID). Each type of data is placed into an intermediate memory, such as video buffer 208 or audio buffer 210, that functions as a FIFO memory.

A video decoder 212 converts the compressed video data into individual video frames by obtaining the video data from the video buffer 208 and, in accordance with the identified video compression standard, produces complete video frames at the appropriate resolution and video frame rate. The complete video frames are stored into a video frame buffer 214. The video data in the video buffer 214 contains a program relative time stamp 216 corresponding to the video image to be constructed. This video time can be updated and made available for use by the system 110.

The audio decoder 218 converts the compressed audio data into a PCM digital data stream by obtaining the data from the audio buffer 210 and, in accordance with the identified audio compression standard, produces complete audio samples at the appropriate sample rate. The complete audio samples are stored into an audio "frame" buffer 220. The audio data in the audio buffer 220 contains a program relative time stamp 222 corresponding to the audio to be presented. The audio time can also be updated and made available for use by the system 110.

A video driver 224 pulls data from the video frame buffer 214 and produces a video output at the appropriate resolution and frame rate. Video output is driven by the video playback clock. Likewise, an audio driver 226 pulls audio samples from the audio buffer 220 and places them into digital to analog converters (D/A Converters) to produce the desired audio signal. The rate at which samples are provided to the D/A converters is driven by the audio playback clock.

The decoder 126 can further include, or be associated with, a controller 228 that operates to control the operations of the components of the decoder 126 described above as can be appreciated by one skilled in the art.

According to an embodiment of the present invention, a source 112 (see FIGS. 3 and 4) will insert into the data network an RTP data stream at a rate consistent with the content. Thus, if the content is 1.5 Mbps video multiplexed with two 128 kbps audios, the average output rate of the source 112 would be 1.76 Mbps. The multiplexing technique used is MPEG-2 transport which provides for independent time information on both the video and each audio stream. The RTP data stream also has a block time parameter established by the source.

Each playback device (e.g., video player 108 or overhead monitor 124) will receive the RTP packets as they are routed through the switched Ethernet network. The source 112 is intended to represent the master timing component of the playback system. The decoder 126 provides playback that maintains a fixed delay between the source data being transmitted onto the network of the IFE system 110 and the presentation of the video or audio. It is desirable to maintain synchronization between all video and audio players to within 66 ms of the source 112.

Figure 11:
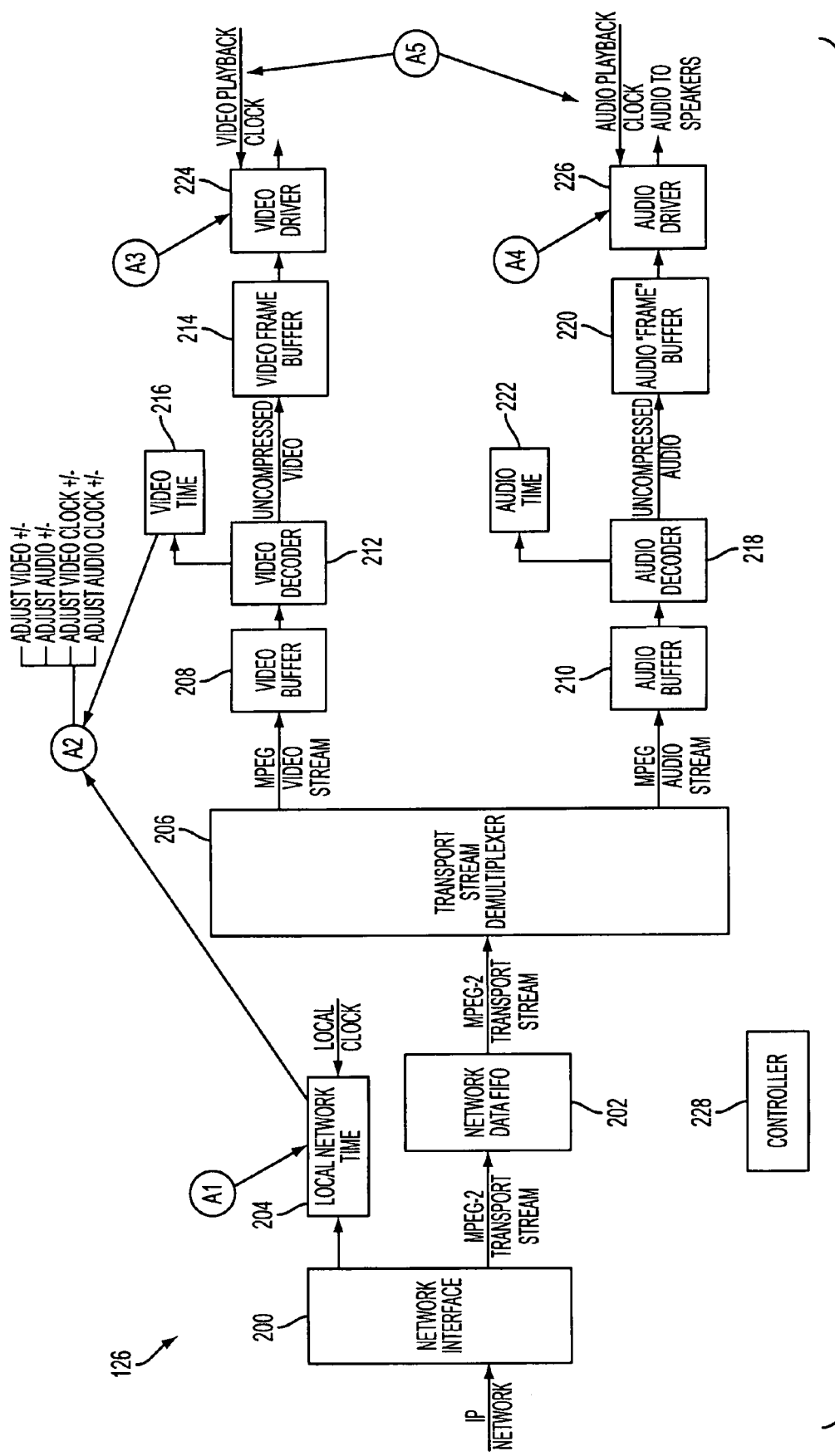
FIG. 11 is a conceptual diagram illustrating an example of operations performed with regard to components of the decoder as shown in FIG. 10 according to an embodiment of the present invention.

FIG. 11 illustrates an example of the decoder architecture shown in FIG. 10, with an indication of an example of the locations in the decoder 126 at which processes A1 through A5 are performed according to an embodiment of the present invention as discussed in more detail below. All of these processes can be performed by the controller 228, for example, along with the components in the decoder 126.

Process A1, is performed to maintain a local version of the program master clock to an accuracy of at or about +/−10 ms, ignoring network propagation delay. This provides a common, system-wide program master clock from the data which arrives with varying system delay (jitter). The program master clock is program specific and derived from the MPEG content itself. Hence, when program streams are changed, a new, program-specific master clock is established.

An MPEG-2 transport stream contains several different clocks. For purposes of this description, the Program Clock Reference (PCR) will be used as the data element from which the program master clock will be derived. The PCR is a 33-bit number that is presented in occasional 188 byte transport stream packets, and typically there can be 700 ms or more between packets containing the PCR.

The arrival of a packet with a PCR is used to initialize and adjust the program master clock of the player. It is anticipated that packets will arrive from the network with a delay that is a Poisson distribution, where the minimum time will be a fixed value related to the topology of the network and the number of switches that the packet is to pass through. The master clock derivation algorithm is to establish a clock that stays locked to the earliest arrival time of the PCR (specifically not the average arrival time).

Figure 12:
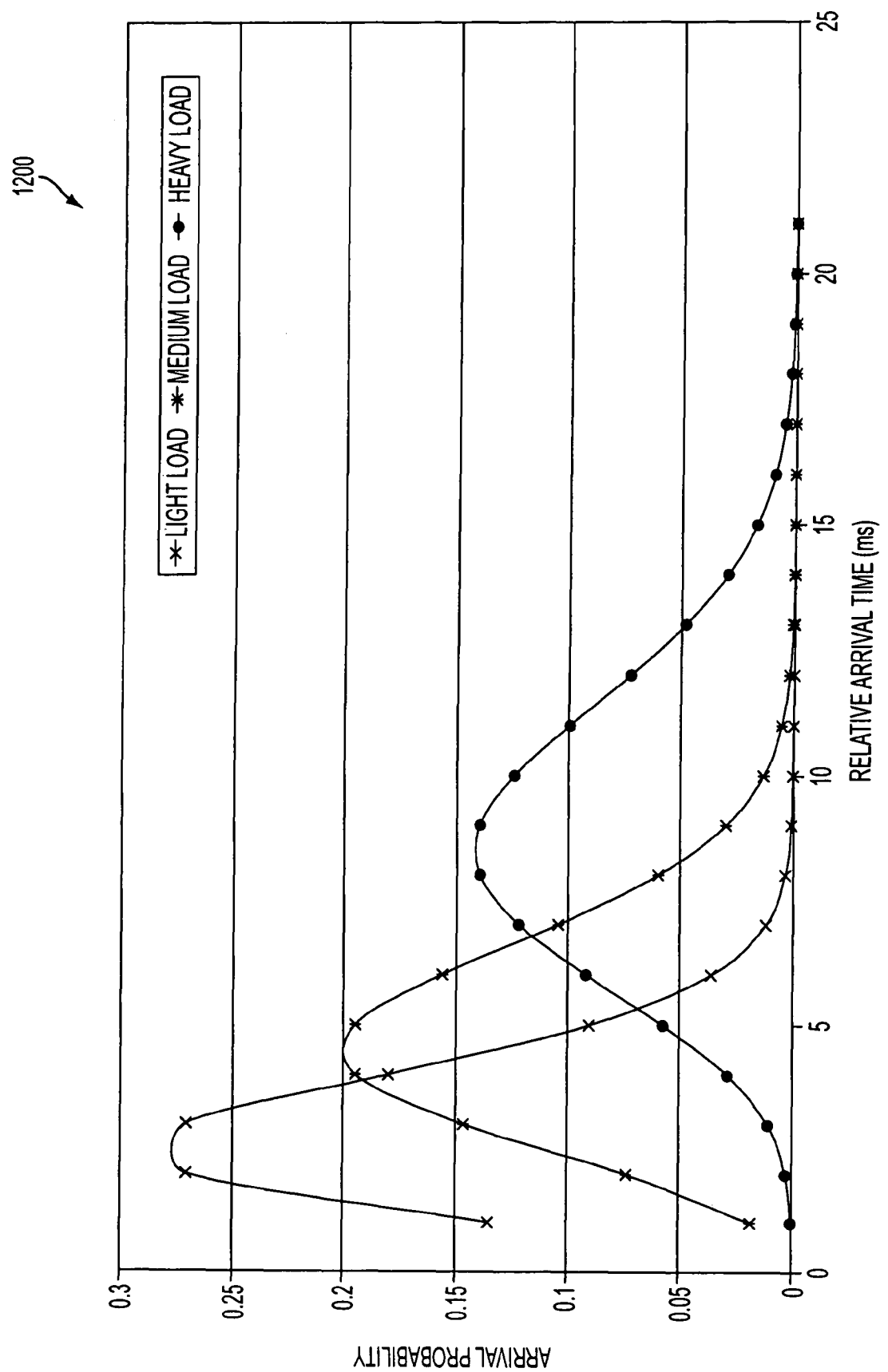
FIG. 12 is a graph illustrating an example of packet arrival times at a presentation device in the system shown in FIG. 3 based on the load in the system.

FIG. 12 is a graph 1200 illustrating an example of an anticipated distribution of packet arrival and the basis for locking on earliest arrival and not average arrival. As discussed above, packets from the source 112 may experience delays associated with source jitter (Problem P1), load based jitter (Problem P2) and the network topology delay (Problem P3). The network topology delay (P3) is a fixed value based on the number of switches between the source device and the player. While the value for the network topology delay will vary between the various displays, the typical variation of network topology delay in an aircraft will have a variation of around 1 ms, which is viewed as not significant.

Variation/jitter produced by source and load based jitter will generally be statistical in nature. It would be expected that at a given load, the arrival distribution would follow a Poisson distribution with the minimum time (zero statistical delay). At a given load both the minimum time and average delay are fixed values. However, an IFE system 110 typically does not have a fixed load but has a widely varying load. This variation in load will cause significant variation in the average delay time but generally has no effect on the minimum delay. If all links are 100BaseT and the seat columns are daisy chained up to 10 deep, there are approximately 13 Ethernet switches for a packet to pass through. If a maximum buffer backup in the switches to 128. a minimum delay of around 1.5 ms (13 packets transfer time) and a maximum delay of around 18 ms (141 packets transfer time) are obtained.

Figure 13:
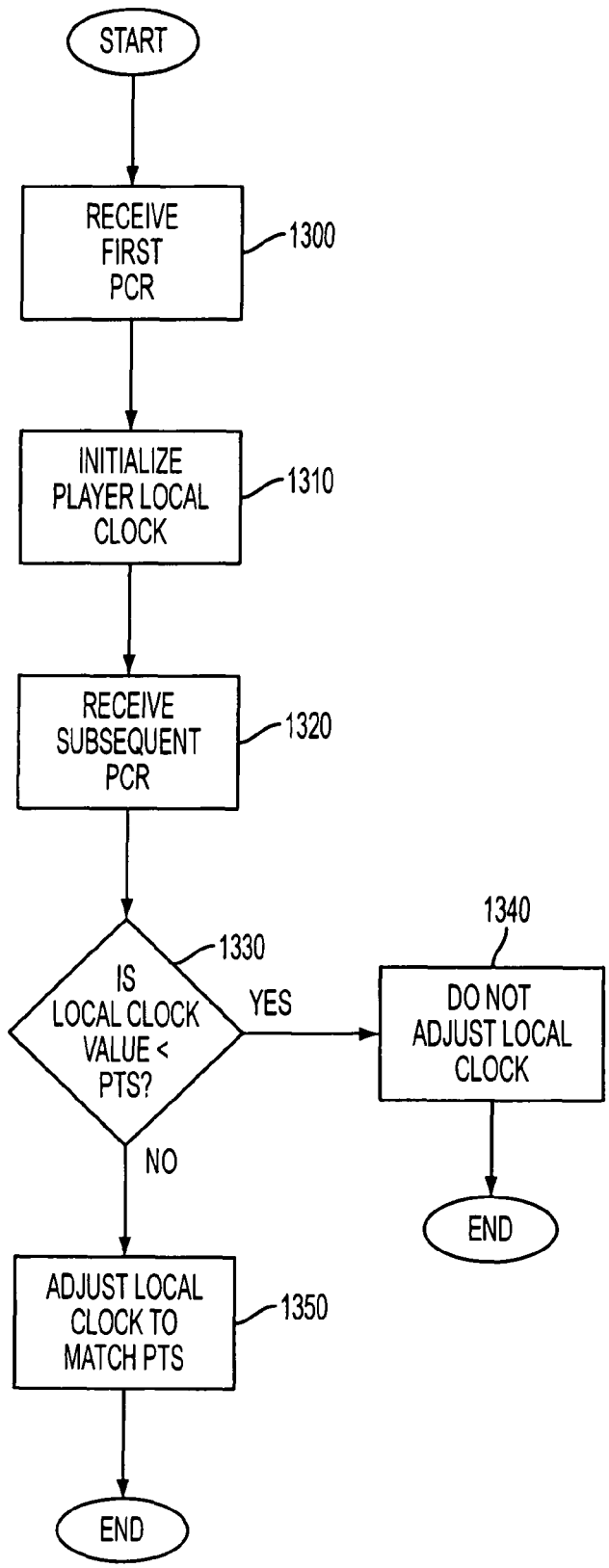
FIG. 13 is a flowchart illustrating an example of operations performed that relate to establishing a local clock in the decoder as shown in FIG. 10 according to an embodiment of the present invention.

As shown in the flowchart of FIG. 13, the master clock processing will establish a free running player local clock whose frequency is slightly (~200 ppm) slower than real time. The arrival of the first PCR at step 1300 will be used to initialize the player local clock and start its playback in step 1310. When a subsequent PCR arrives at step 1320, it will be compared to the value of the free-running player local clock. If the value of the free-running local clock is determined in step 1330 to be less than the PTS (earlier), the free-running clock is not adjusted (the packet has been delayed) in step 1340. However, if the value of the free-running local clock is greater than the PTS (later), the free-running clock is adjusted in step 1350 to match or substantially match the PTS (the free-running clock has become slow).

Figure 14:
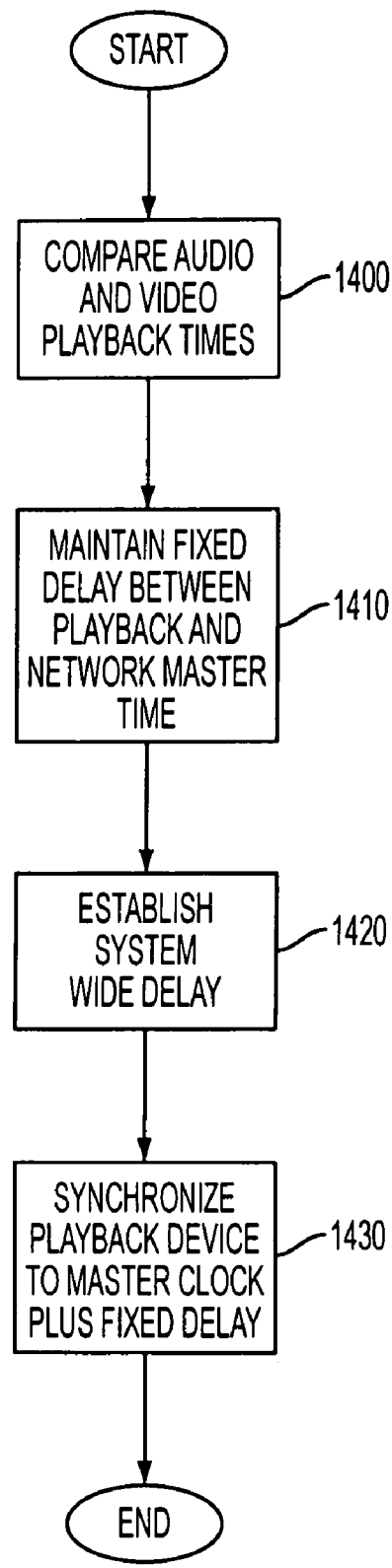
FIG. 14 is a flowchart illustrating an example of operations performed that relate to adjusting playback times in the decoder as shown in FIG. 10 according to an embodiment of the present invention.

As shown in the flowchart of FIG. 14, processing A2 is performed to compare audio and video playback times to network time in step 1400 and initiate adjustments to maintain a fixed delay between playback and network master time in step 1410. To accommodate the various jitter sources and prevent data under-run at the playback device, a certain amount of data is stored before playback starts. This results in a delay between the actual arrival of data and the playback of the data. To maintain synchronization between all playback devices, a system-wide delay is established in step 1420 and the playback devices will synchronize to the master clock plus this fixed delay in step 1430. The minimum value for this delay is the worst case combined delay through the system plus some margin. A value of 500 ms is often a safe value.

Processing A3 is performed to move video presentation by +/−1 video frame (e.g., 33 ms). As can be understood in the art, a video player 108 has adjustment features to provide a time like the PCR (extracted from the MPEG material itself) associated with the actual video frame being presented, support the ability to repeat a video frame (freeze for an increment of 33 ms), and support the ability to skip a video frame (jump ahead an increment of 33 ms). In addition, a video player 108 will perform start playback, pause playback, and stop playback, and purge remaining data.

Some MPEG decoders (e.g, the IBM Set Top Decoder) provide a parameter referred to as the video Presentation Time Stamp (PTS) which is to represent the time of the actual image being presented. This parameter is reliably accessible for use in the comparison algorithm.

Figure 15:
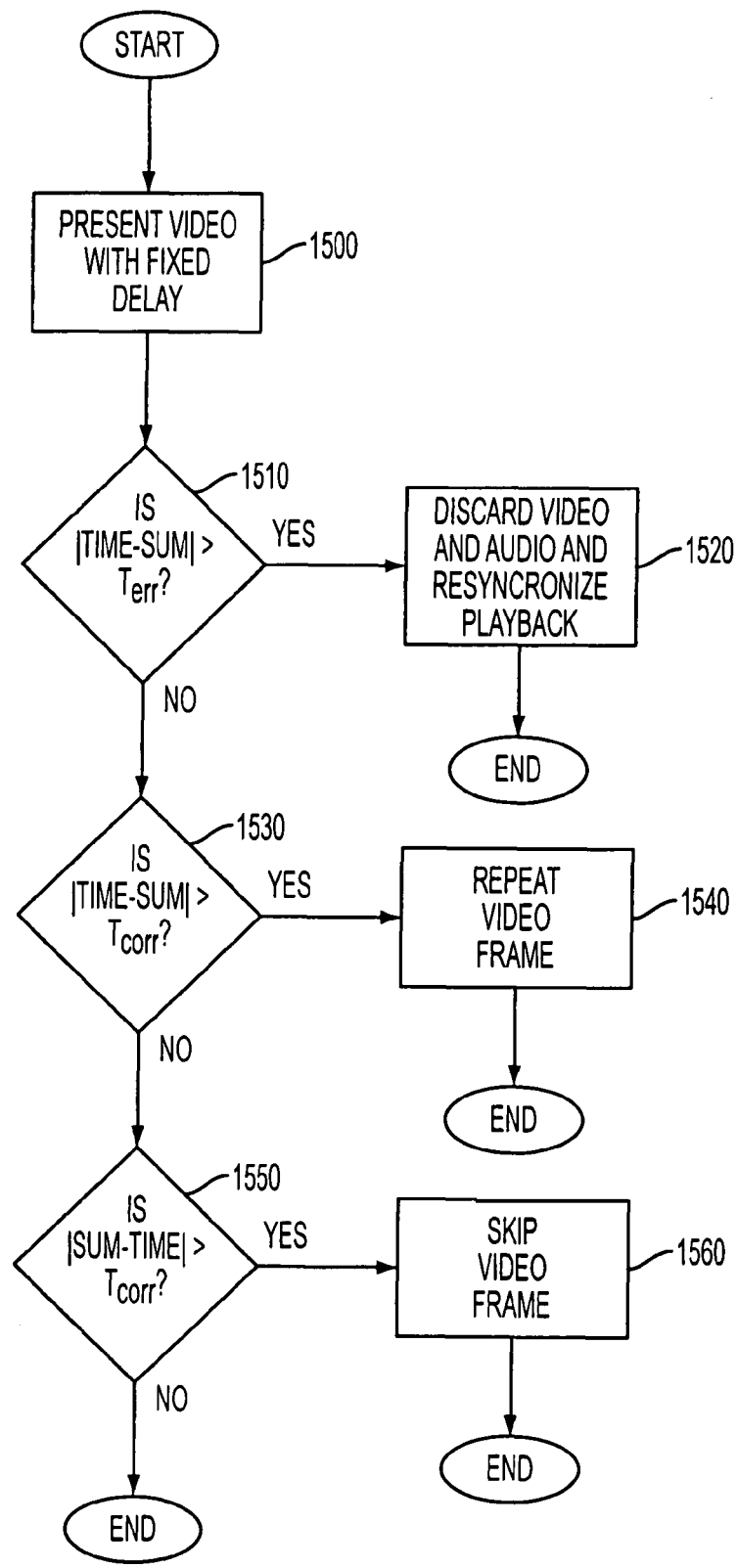
FIG. 15 is a flowchart illustrating an example of operations performed that relate adjusting video playback in the decoder as shown in FIG. 10 according to an embodiment of the present invention.

As show in the flowchart of FIG. 15, the video is to be presented with a fixed delay with respect to the derived program master clock in step 1500. The video player 108 provides the clock associated with the video frame being presented. This assures that the video frame being presented is within +/−66 ms (2 video frames) of the master clock plus fixed delay. If the time associated with the video frame is determined to be more than $t_{err}$ ms different from the master clock in step 1510, it is assumed that the system 110 has totally lost sync. When the system 110 has totally lost sync, the audio and video are both purged (discarded) and the playback is restarted and resynchronized to the incoming stream in step 1520.

If the time associated with the video frame being presented is not more than $t_{err}$ ms different from the master clock, and the time is determined to be larger than the sum by more than $t_{corr}$ ms (but not more than $t_{err}$) in step 1530, the video player 108 will be requested to repeat a video frame in step 1540. A typical value for $t_{corr}$ would be around 45 ms and $t_{err}$ would be around 200 ms, but can be any suitable value. If the time associated with the video frame being presented is determined to be smaller than the sum by more than $t_{corr}$ ms (but not more than $t_{err}$) in step 1550, the video player 108 will be requested to skip a video frame in step 1560.

Processing P4 is performed to shift audio presentation +/−33 ms. An audio player typically will provide a time like the PCR (extracted from the MPEG material itself) associated with the actual audio being presented, support the ability to insert silence (for an increment of 33 ms), and support the ability to skip ahead (e.g., an increment of approximately 33 ms). In addition, the audio player performs start playback, pause playback, stop playback and can purge remaining data.

Some MPEG decoders (e.g., the IBM Set Top) provide a parameter called the audio Presentation Time Stamp (PTS) which is to represent the time of the actual aural signal being presented, and used in the comparison algorithm.

Figure 16:
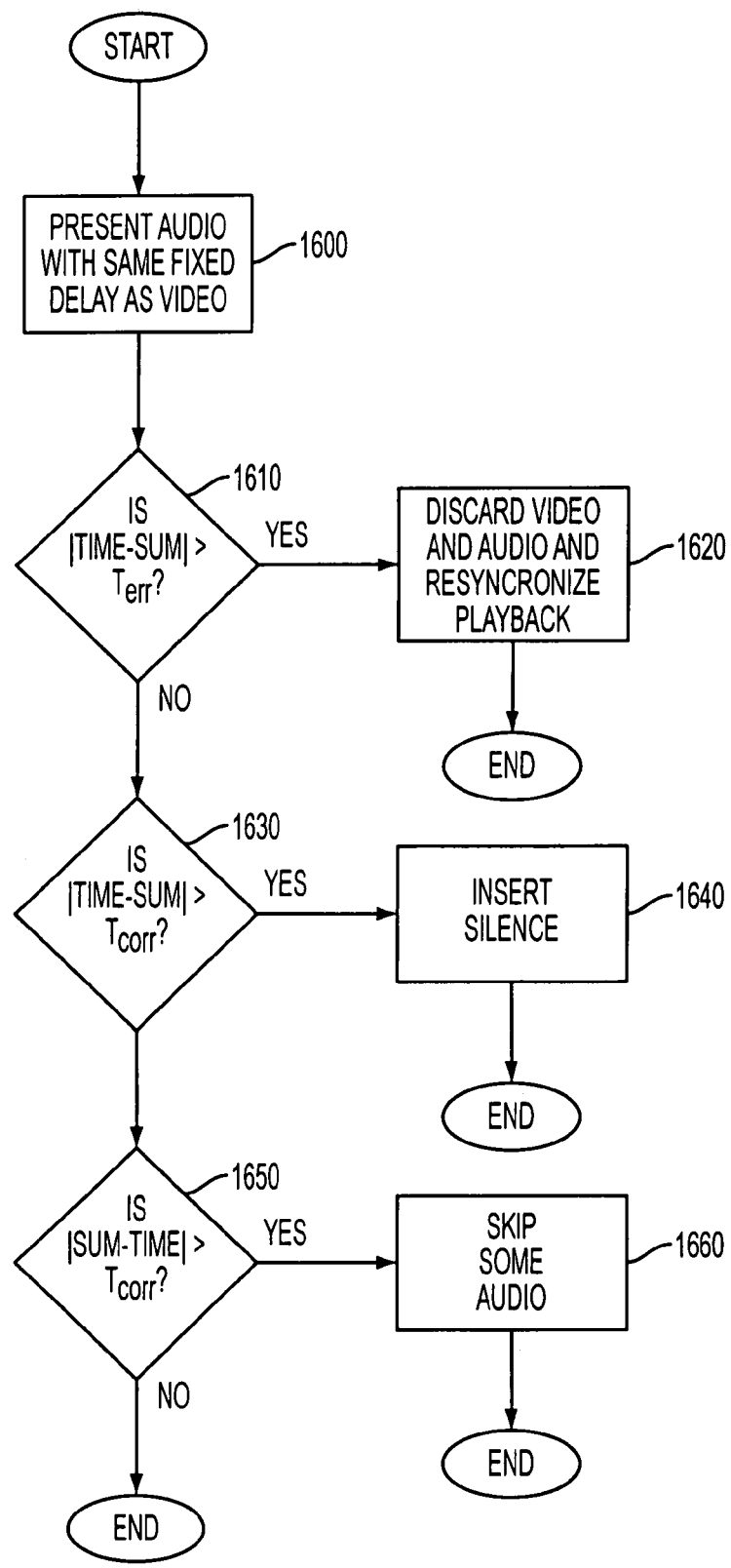
FIG. 16 is a flowchart illustrating an example of operations performed that relate adjusting audio playback in the decoder as shown in FIG. 10 according to an embodiment of the present invention.

As shown in the flowchart of FIG. 16, the audio is to be presented with the same or substantially the same fixed delay with respect to the derived program master clock as the video in step 1600. The audio player provides the clock associated with the audio being presented to assure that the audio being presented is within +/−66 ms (2 video frames) of the master clock plus fixed delay. If the time associated with the audio is determined to be more than $t_{err}$ ms different from the master clock in step 1610, it is assumed that the system has totally lost sync. When the system 110 has totally lost sync, the audio and video are both purged (discarded) and the playback is restarted and resynchronized to the incoming stream in step 1620.

If the time associated with the video frame being presented is not more than $t_{err}$ ms different from the master clock, and is determined to be not larger than the sum by more than $t_{corr}$ ms (but not more than $t_{err}$) in step 1630, the audio player will be requested to insert approximately 33 ms of silence in step 1640. A typical value for $t_{corr}$ would be around 45 ms and $t_{err}$ would be around 200 ms, but could be any suitable value. If the time associated with the audio being presented is determined to be smaller than the sum by more than $t_{corr}$ ms (but not more than $t_{err}$) in step 1650, the audio player will be requested to skip approximately 33 ms of audio in step 1660.

Figure 17:
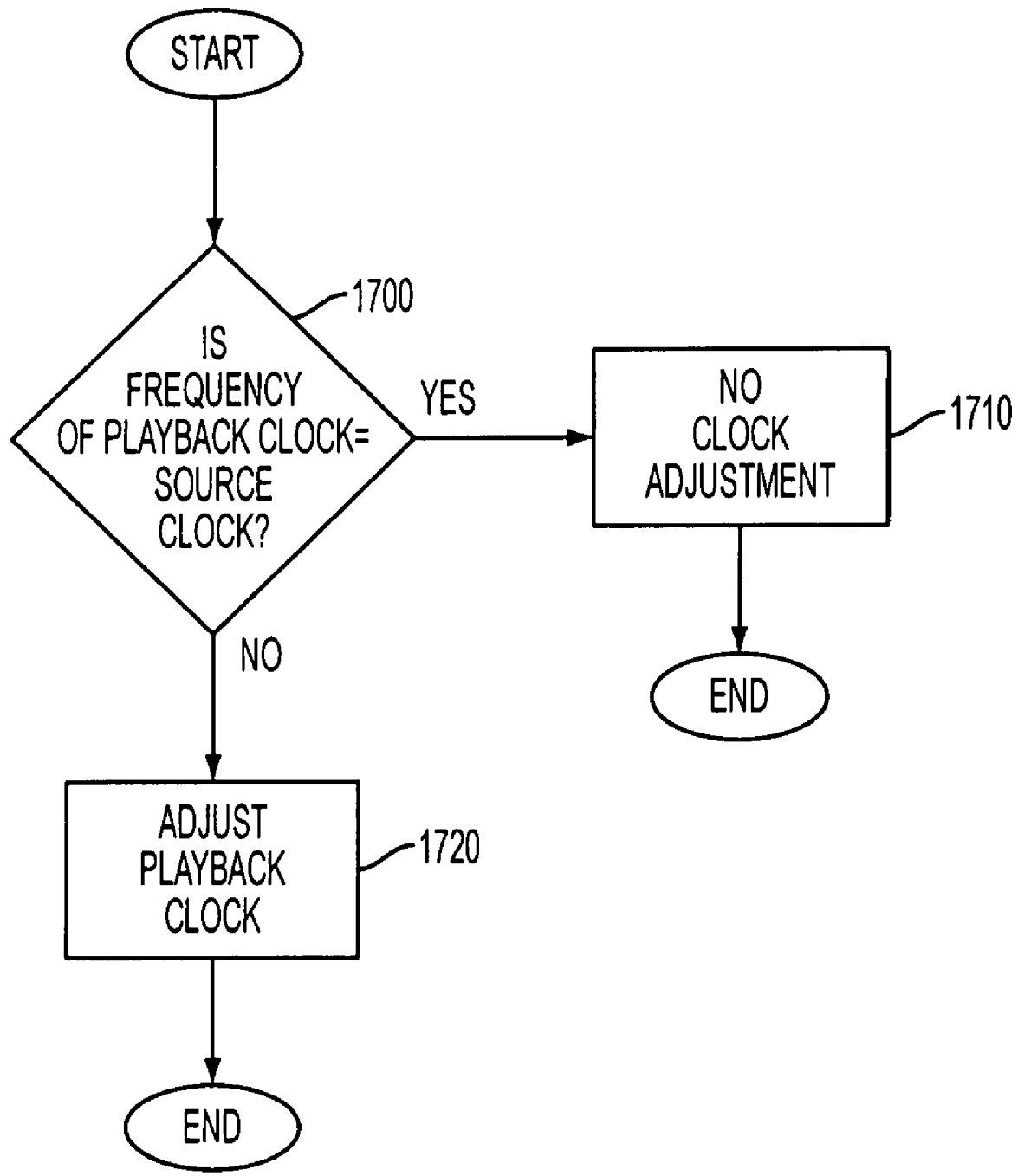
FIG. 17 is a flowchart illustrating an example of operations performed that relate adjusting and audio and/or video clock in the decoder as shown in FIG. 10 according to an embodiment of the present invention.

As shown in the flowchart of FIG. 17, processing A5 is performed to speed or slow audio and/or video clock by a slight amount (~100 ppm). The frequency of the playback clock should differ from the source clock by no more than 100 ppm, as determined in step 1700. If the frequency of the playback clock is approximately equal to that of the source clock, the playback clock is not adjusted in step 1710. However, if this is not the case, the playback clock could provide an adjustment to be speed up or slowed down by 100 ppm (3 settings: 100 ppm slow, nominal, 100 ppm fast) in step 1720.

Other techniques can be used to determine the actual time associated with the audio and video signals being presented. There may be alternative ways to cause the audio to advance or retreat by the appropriate amount of time, and to cause the video to advance or retreat by the appropriate amount of time. There may also be alternate ways of establishing a system-wide clock that is accurate to within single-digit milliseconds across all devices playing a particular video program.

Although only a few exemplary embodiments of the present invention have been described in detail above, those skilled in the art will readily appreciate that many modifications are possible in the exemplary embodiments without materially departing from the novel teachings and advantages of this invention. For example, the order and functionality of the steps shown in the processes may be modified in some respects without departing from the spirit of the present invention. Accordingly, all such modifications are intended to be included within the scope of this invention as defined in the following claims.

What is claimed is:

1. A method for synchronizing digital video and audio playback by at least two video players and at least two audio players in a system, the method comprising:

providing digital video and audio data over a digital data network to a plurality of decoders associated with the at least two video players and the at least two audio players, each of the plurality of decoders connected to the digital data network at a different location; and operating each of the plurality of decoders to adjust a local clock of the respective decoder based on a master clock derived from content of the data, set a system delay time in relation to the master clock, the system delay time representing a maximum delay in delivering the digital video and audio data to the plurality of decoders, and adjust video and audio playback based on their respective local clock and the system delay time to substantially synchronize playback of the audio and video data by the at least two audio players and the at least two video players associated with different ones of the plurality of decoders.

2. A method as claimed in claim 1, wherein operating each of the plurality of decoders to adjust the local clock comprises:
- initializing the local clock upon receipt of a program clock reference (PCR); and
- upon receipt of a subsequent PCR, determining whether to adjust the local clock based on a value of the local clock in relation to a presentation time stamp (PTS).

3. A method as claimed in claim 2, wherein operating each of the plurality of decoders to adjust the local clock further comprises:
- adjusting the value of the local clock to substantially match the PTS if the value of the local clock is greater than the PTS.

4. A method as claimed in claim 1, wherein operating each of the plurality of decoders to adjust video playback comprises:
- comparing a time value at which a video frame is being presented in relation to a sum of a time of the master clock and the system delay time; and
- operating the at least one video player to at least one of restart, replay or skip the video frame based on the comparison.

5. A method as claimed in claim 4, further comprising:
- operating one of the at least two video players to restart video presentation when the time value is greater than the sum by a first amount.

6. A method as claimed in claim 5, further comprising:
- operating the one of the at least two video players to skip presenting the video frame when the time value is greater than the sum by a second amount that is less than the first amount.

7. A method as claimed in claim 5, further comprising:
- operating the one of the at least two video players to repeat presenting the video frame when the time value is less than the sum by a third amount that is less than the first amount.

8. A method as claimed in claim 1, wherein operating each one of the plurality of decoders to adjust audio playback comprises:
- comparing a time value at which a moment of audio is being presented to a sum of a time of the master clock and the system delay time; and
- operating one of the at least two audio players to at least one of restart, skip ahead in the audio or refrain from presenting audio for a time period based on the comparison.

9. A method as claimed in claim 8, further comprising:
- operating the one of the at least two audio players to restart audio presentation when the time value is greater than the sum by a first amount.

10. A method as claimed in claim 9, further comprising:
- operating the one of the at least two audio players to refrain from presenting audio for the period, when the time value is greater than the sum by a second amount that is less than the first amount.

11. A method as claimed in claim 9, further comprising:
- operating the at one of the at least two audio players to skip ahead in the audio when the time value is less than the sum by a third amount that is less than the first amount.

12. A method as claimed in claim 1, further comprising:
- adjusting a frequency of at least one of a first playback clock associated with one the at least two video players or a second playback clock associated with the one of the at least two audio players in relation to a clock associated with a source that provides the digital video and audio data.

13. A method as claimed in claim 1, wherein the method operates so that a person is able to perceive a frame of the digital video being presented on a first of the at least two video players at substantially a same time as the frame is presented on a second of the at least two video players.

14. A decoder, associated with an audio player and a video player, for use in a digital system that provides digital video and audio data, the decoder comprising:
- a network interface that receives the digital video and audio data;
- a local clock;
- a video decoder and an audio decoder that decode the received video and audio data;
- a video driver and an audio driver that drive the associated video player and the associated audio player; and
- a controller to adjust the local clock based on a master clock derived from content of the data, to set a playback time for the decoded video and audio based on the master clock and a system-delay time to substantially synchronize playback of the audio and video data by the audio player and the video player with playback of the audio and video data at another audio player and another video player associated with a different decoder in the system that also receives the digital video and audio data, wherein the system delay time represents a maximum delay in delivering the digital video and audio data to the decoders, the decoders coupled to the digital system at different locations.

15. A decoder as claimed in claim 14, wherein:
- the controller is to adjust the local clock by initializing the local clock upon receipt of a program clock reference (PCR), and upon receipt of a subsequent PCR by the interface, adjust the local clock based on a value of the local clock in relation to a presentation time stamp (PTS).

16. A decoder as claimed in claim 14, wherein:
- the controller is to adjust video playback by comparing a time value at which a video frame is being presented by the video player in relation to a sum of a time of the master clock and the system delay time, and to control the video driver to operate the video player to at least one of restart, replay or skip the video frame based on the comparison.

17. A decoder as claimed in claim 14, wherein:
- the controller is to adjust audio playback by comparing a time value at which a moment of audio is being presented by the audio player in relation to a sum of a time of the master clock and the system delay time, and to control the audio driver to operate the audio player to at least one of restart, skip ahead in the audio or refrain from presenting audio for a period based on the comparison.

18. A decoder as claimed in claim 14, wherein the controller is to adjust a frequency of at least one of a first playback clock associated with the video player and a second playback clock associated with the audio player in relation to a clock associated with a source that provides the digital video and audio data.

* * * * *